Feb. 3, 1959 — L. O. UPTON — 2,871,624
METHOD OF ANNEALING GLASS
Filed June 14, 1954
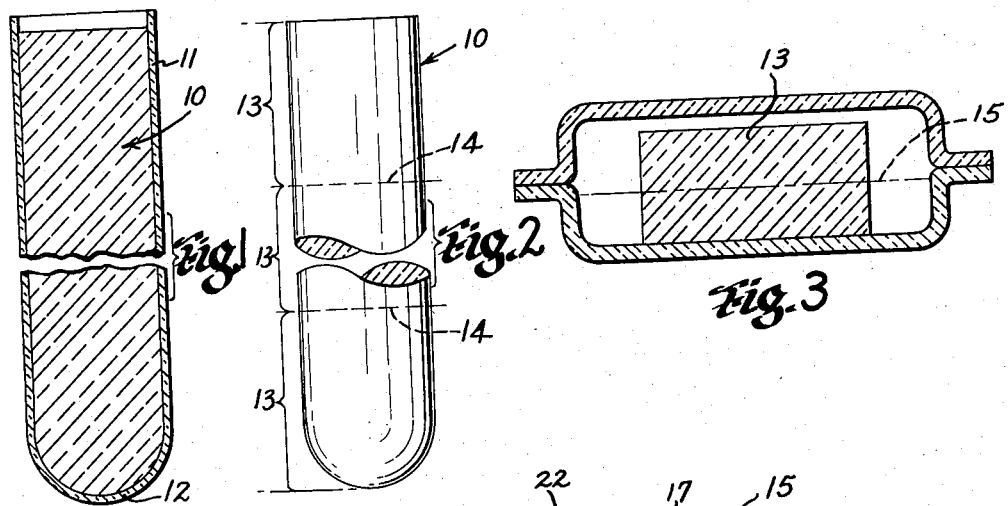
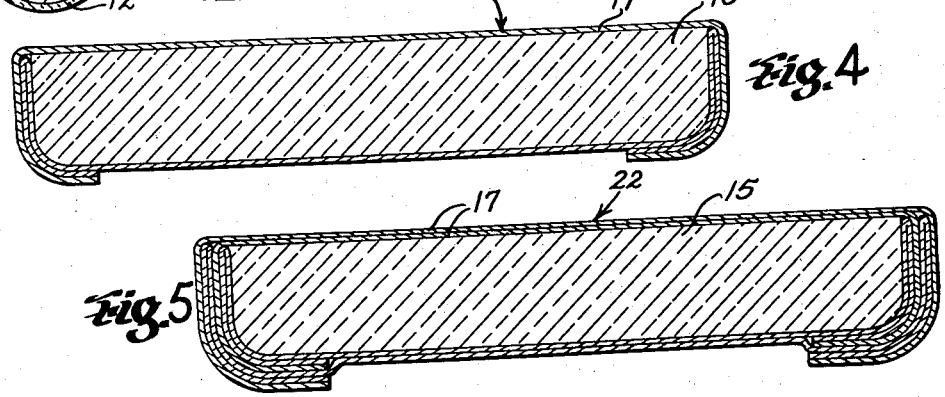
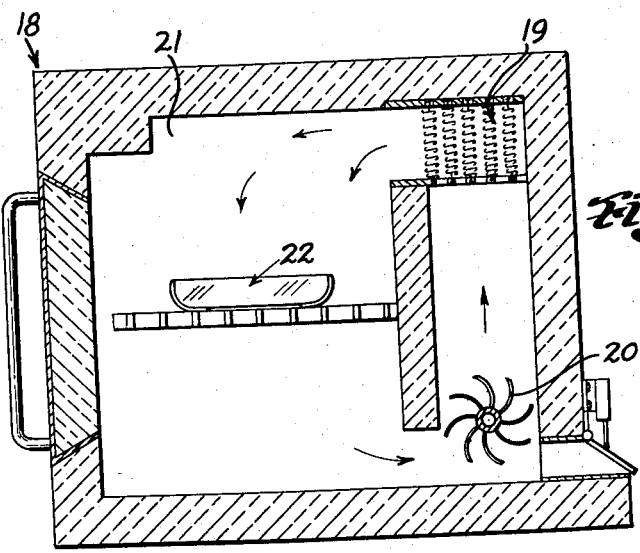
INVENTOR
LEE O. UPTON
BY
ATTORNEY

United States Patent Office 2,871,624
Patented Feb. 3, 1959

2,871,624
METHOD OF ANNEALING GLASS

Lee O. Upton, Sturbridge, Mass., assignor to American Optical Company, Southbridge, Mass., a voluntary association of Massachusetts Application June 14, 1954, Serial No. 436,697

4 Claims. (Cl. 49—89)

This invention relates to glass annealing and has particular reference to a novel method of obtaining stress relief annealing.

One of the principal objects of the invention is to provide a novel method of annealing whereby a more uniform thermal distribution of heat is possible during said annealing operation.

Another object is to provide a more uniform thermal distribution of heat in the glass being annealed by providing said glass with a metallic covering in relatively intimate relation therewith during the annealing operation.

Another object is to provide a novel method of annealing glass of low refractoriness having a relatively high thermal expansion embodying wrapping the glass rather intimately in a metal foil and subjecting said wrapped glass to an annealing cycle whose maximum temperature is below the melting temperature of the metal and equivalent to the softening temperature or slightly above the softening temperature of the glass.

Other objects and advantages of the invention will become apparent from the following disclosure taken in connection with the accompanying drawings in which:

Fig. 1 is a cross sectional view of a container in which the glass in accordance with the invention is first formed;

Fig. 2 is a side elevational view of the formed glass;

Fig. 3 is a sectional view illustrating one step of the method;

Fig. 4 is a sectional view illustrating another step of the method;

Fig. 5 is a sectional view of a modified step of the method; and

Fig. 6 is a vertical cross-sectional view of means for performing a further step of the method.

In the fabrication of certain glasses, for example, glasses of the arsenic sulphide type, such as set forth in applicant's pending application, Serial No. 384,294, filed October 5, 1953, and which issued August 27, 1957 as Patent No. 2,804,378, it has been the practice to fabricate the glass in billets 10 which are relatively long and narrow in a Pyrex test tube 11 with a closed end at the bottom 12. These billets are cut up into lengths 13 of proper weight as illustrated by the dash lines 14 in Fig. 2 so as to provide the proper amount of glass for slumping into blanks 15 by subjecting said glass to heat of a temperature approximately 600° F. in a suitable furnace 18 as diagrammatically illustrated in Fig. 6.

It has been found that such slumped glass blanks, during subsequent grinding and polishing to the final shapes desired, have a tendency to crack or shatter due to the presence of internal strains and stresses which, during the grinding and polishing, are non-uniformly relieved.

Attempts have been made, either prior to the grinding and polishing of said blanks or subsequent thereto, when such pieces have been successfully ground and polished without breakage, to thereafter anneal the glass with a view to relieving these internal strains and stresses by using standard annealing processes. These standard annealing processes have produced unpredictable and, in most instances, undesirable results.

It has been found, however, that if the glass blanks or ground and polished pieces of glass are wrapped in metal, such as aluminum foil 17 or the like placed in relatively intimate contact with the glass throughout the outer surface area thereof as shown in Figs. 4 and 5, and then subjected to a controlled annealing cycle that very desirable and uniform results are obtained.

One of the principal objects of the invention, therefore, is to provide a novel method of obtaining a more uniform thermal distribution of heat during the annealing operation through the provision of an intimate metal foil wrapping 17 on the glass.

In instances when the metal foil 17 is used, several layers of said metal foil 17 are placed in intimate relation with each other and in intimate contact with the outer surface area of the glass 15 as shown in Fig. 15. The glass, in this particular instance, has a relatively low refractoriness and a very high thermal expansion of about $24.6 \times 10^{-6}/°$ C., which is approximately 8 times that of Pyrex glass or 2½ times that of crown glass.

It has been found that very satisfactory results have been obtained with an annealing cycle which comprises raising the temperature of the glass from room temperature gradually and continuously throughout a period of approximately 5 hours to a temperature of approximately 430° F. This is obtained by progressively increasing the temperature throughout the time cycle set forth above. The temperature of 430° F. is retained for a period of approximately 4 hours and the temperature is then reduced gradually and progressively from said 430° F. to approximately 300° F. over a period of approximately 24 hours and the furnace is then shut off to allow the glass to cool down from said 300° F. to room temperature at its natural rate and with the furnace sealed. The 430° F. set forth above is the temperature at which the particular glass recited softens and the 300° F. is a temperature below that of the strain point of the glass. With the present recited temperatures annealing may be accomplished in a much shorter period of time than would be required if the temperature was so controlled that annealing takes place substantially midway between the softening temperature and the strain point of the glass as has been usual with prior art annealing.

It has been found that with the above annealing cycle, annealing begins somewhere above the softening temperature of the glass and extends below the straining point thereof. After the blanks have been brought down to room temperature and the aluminum foil 17 is removed, it has further been found that the foil does not stick to the glass and that impressions of the contact points of said aluminum foil 17 with the glass are left in the surface thereof indicating that the glass had softened sufficiently to allow said impressions to remain.

A satisfactory furnace 18 for this type of annealing is a furnace 18 such as shown in Fig. 6 which comprises a regular nichrone resistance coil heating element 19 with a water-cooled circulating fan 20 which circulates the air through the heating element and transfers the heat by convection throughout the furnace cavity 21 and over the foil-wrapped glass 22 to be annealed.

Although the above-described type of furnace produces desirable results, it is to be understood that any ordinary resistance furnace which has no circulating fan but which radiates its heat or conducts its heat would be satisfactory. The principle involved here would be that the glass covered with metal foil in a multiplicity of layers evenly or substantially uniformly redistributes the heat which is radially conducted or convected through the furnace to the glass being annealed. This results from the conducting characteristics of the metal itself. Although the annealing technique set forth above has been described for use with arsenic sulphide glass, it is to be understood that the same technique may be applied to other glasses by varying the temperature and annealing cycle accordingly, the essential step being that of intimately placing the metal foil about the piece of glass to be annealed and retaining it thereon during the annealing cycle.

It is further pointed out that, although aluminum foil has been specified as being practical for use, other metals such as copper or any of the high thermal conducting metals in foil or granular form may be used.

The resulting annealed glass may then be finished by grinding and polishing in the conventional manner and will be relatively stable and non-susceptible to cracking or shattering.

From the foregoing description it will be apparent that an improved method has been provided for accomplishing all of the objects and advantages of the invention.

While the novel features of the invention have been described and are pointed out in the annexed claims, it is to be understood that various omissions, substitutions, and arrangement of parts and detail of the method shown and described may be made by those skilled in the art without departing from the spirit of the invention. Therefore, it is to be understood that all matter set forth herein is to be interpreted as illustrative and not in a limiting sense.

Having described my invention I claim:

1. A method of annealing a piece of glass comprising wrapping said piece with a metal foil of high thermal conductivity so that said foil is in relatively intimate contact throughout the outer surface area of said piece, placing said glass with said metal foil thereon in a furnace and subjecting it to a controlled annealing range embodying a maximum temperature equivalent to or slightly above the softening temperature of the glass, the intimate contact of the metal foil, during said annealing cycle, and the temperature of heating being such as to cause impressions of the contact points of said foil with said glass to be left in the surface thereof when subsequently removed therefrom thereby causing a more uniform thermal distribution of the heat and causing said glass at the completion of said annealing cycle and when cooled to substantially room temperature to be substantially free from detrimental internal strains and stresses.

2. A method of annealing a piece of glass comprising wrapping said piece with several layers of a metal foil of high thermal conductivity in intimate relation with each other and so that said layers of foil are in relatively intimate contact throughout the outer surface area of said piece, placing said glass with said metal foil thereon in a furnace and subjecting it to a controlled annealing range embodying a maximum temperature equivalent to or slightly above the softening temperature of the glass, the intimate contact of the metal foil, during said annealing cycle, and the temperature of heating being such as to cause impressions of the contact points of said foil with said glass to be left in the surface thereof when subsequently removed therefrom thereby causing a more uniform thermal distribution of the heat and causing said glass at the completion of said annealing cycle and when cooled to substantially room temperature to be substantially free from detrimental internal strains and stresses.

3. The method of annealing glass having a known refractoriness and thermal expansion comprising wrapping a piece of said glass with a metal foil of high thermal conductivity and of substantially uniform thickness so that said foil is in relatively intimate contact throughout the outer surface area of said piece, placing said glass with said metal foil thereon in a furnace and subjecting said glass to an annealing cycle which comprises raising the temperature of the glass from room temperature gradually and progressively throughout a controlled time cycle to a given maximum temperature equivalent to or slightly above the softening temperature of the glass, the intimate contact of the metal foil, during said annealing cycle and the maximum temperature of heating being such as to cause impressions of the contact points of said foil with said glass to be left on the surface thereof when subsequently removed, thereafter reducing said temperature gradually and progressively throughout a given time cycle to a given reduced temperature and then subsequently shutting off the furnace and allowing said glass to cool down to room temperature at its normal rate and with the furnace sealed, the surrounding of the glass with said metal foil during said annealing being adapted to cause a more uniform thermal distribution of heat and causing said glass, at the completion of said annealing cycle and at substantially room temperature, to be subsequently free from internal strains and stresses.

4. The method of annealing glass of a relatively low refractoriness and a very high thermal expansion of about $24.6 \times 10^{-6}/°$ C. comprising wrapping said piece of glass with metal foil of high thermal conductivity so that said foil is in relatively intimate contact throughout the outer surface area of said piece, placing said glass with said metal foil thereon in a furnace and subjecting said glass to an annealing cycle which comprises raising the temperature of the glass from room temperature gradually and progressively throughout a period of approximately 5 hours to a temperature of approximately 430° F. wherein the intimate contact of the metal foil and said temperature of heating is such as to cause impressions of the contact points of said foil with said glass to be left in the surface thereof when said foil is subsequently removed, retaining said glass at said temperature of approximately 430° F. for a period of approximately 4 hours, subsequently reducing said temperature gradually and progressively to approximately 300° F. over a period of approximately 24 hours and then allowing said glass to cool down to room temperature at its natural rate and with the furnace sealed, the surrounding of said glass with said metal foil in relatively intimate contact therewith during said annealing being adapted to cause a more uniform thermal distribution of the heat and causing said glass, at the completion of said annealing cycle and at substantially room temperature, to be substantially free from detrimental internal strains and stresses.

References Cited in the file of this patent

UNITED STATES PATENTS

| Number | Name | Date |
|---|---|---|
| 202,809 | Gerike | Apr. 23, 1878 |
| 210,731 | Weyer | Dec. 10, 1878 |
| 360,732 | Sawyer | Apr. 5, 1887 |
| 900,281 | Holmes | Oct. 6, 1908 |
| 2,609,301 | Lindsey | Sept. 2, 1952 |
| 2,674,536 | Fisher | Apr. 6, 1954 |

FOREIGN PATENTS

| Number | Country | Date |
|---|---|---|
| 996,809 | France | Sept. 5, 1951 |
| 455,494 | Germany | July 26, 1928 |